United States Patent
McKown

(10) Patent No.: US 10,324,658 B1
(45) Date of Patent: Jun. 18, 2019

(54) MEMORY SHARING FOR BUFFERED MACRO-PIPELINED DATA PLANE PROCESSING IN MULTICORE EMBEDDED SYSTEMS

(71) Applicant: OPEN INVENTION NETWORK LLC, Durham, NC (US)

(72) Inventor: Russell C. McKown, Richardson, TX (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 261 days.

(21) Appl. No.: 15/390,624

(22) Filed: Dec. 26, 2016

Related U.S. Application Data

(63) Continuation of application No. 14/987,423, filed on Jan. 4, 2016, now Pat. No. 9,942,327, which is a continuation of application No. 13/792,326, filed on Mar. 11, 2013, now Pat. No. 9,229,847.

(60) Provisional application No. 61/625,754, filed on Apr. 18, 2012.

(51) Int. Cl.
*G06F 3/00* (2006.01)
*G06F 3/06* (2006.01)

(52) U.S. Cl.
CPC .......... *G06F 3/0659* (2013.01); *G06F 3/0613* (2013.01); *G06F 3/0656* (2013.01); *G06F 3/0683* (2013.01)

(58) Field of Classification Search
CPC .... G06F 3/0659; G06F 3/0683; G06F 3/0613; G06F 3/0656
See application file for complete search history.

(56) References Cited

U.S. PATENT DOCUMENTS

| | | | | |
|---|---|---|---|---|
| 7,523,468 B1 * | 4/2009 | Jha | ......... | G06F 13/102 719/321 |
| 7,594,234 B1 * | 9/2009 | Dice | ....... | G06F 9/461 718/100 |
| 9,009,660 B1 * | 4/2015 | Griffin | ...... | G06F 9/48 717/114 |
| 2003/0140179 A1 * | 7/2003 | Wilt | ....... | G06F 9/3851 719/321 |
| 2005/0108715 A1 * | 5/2005 | Kanai | ..... | G06F 9/4881 718/100 |

(Continued)

*Primary Examiner* — Adam Lee

(57) ABSTRACT

Disclosed are an apparatus and method of operating and allocating a shared memory between various applications operating via a processing computing platform. One example may include receiving a first buffer context switch request message from a first application operating via a processor, transmitting a first buffer context switch flag to the processor operating the application confirming the first buffer context switch request was received, receiving a second buffer context switch request from a second application with a different processing cycle operating via the processor and transmitting a second buffer context switch flag to the processor operating the second application confirming the second buffer context switch request was received. Once the applications have been identified and confirmed, a synchronization operation may be performed to create a shared number of memory units between at least two different buffers and provide the shared memory units to the first application and the second application.

20 Claims, 8 Drawing Sheets

(56) References Cited

U.S. PATENT DOCUMENTS

| | | | |
|---|---|---|---|
| 2006/0230258 A1* | 10/2006 | Di Gregorio | G06F 9/3851 |
| | | | 712/228 |
| 2007/0074207 A1* | 3/2007 | Bates | G06F 9/4881 |
| | | | 718/1 |
| 2008/0177930 A1* | 7/2008 | Isaac | G06F 9/5016 |
| | | | 711/103 |
| 2008/0178180 A1* | 7/2008 | Sporny | G06F 9/4887 |
| | | | 718/102 |
| 2008/0196037 A1* | 8/2008 | Ple | G06F 9/3851 |
| | | | 718/107 |
| 2010/0306479 A1* | 12/2010 | Ezzat | G06F 15/167 |
| | | | 711/147 |
| 2013/0067018 A1* | 3/2013 | Reynolds | H04L 12/6418 |
| | | | 709/212 |

* cited by examiner

MEMORY SHARING FOR BUFFERED MACRO-PIPELINED DATA PLANE PROCESSING IN MULTICORE EMBEDDED SYSTEMS

CROSS REFERENCE TO RELATED APPLICATIONS

This application is a continuation of U.S. patent application Ser. No. 14/987,423, entitled "MEMORY SHARING FOR BUFFERED MACRO-PIPELINED DATA PLANE PROCESSING IN MULTICORE EMBEDDED SYSTEMS," filed Jan. 4, 2016, which is a continuation of U.S. patent application Ser. No. 13/792,326, entitled "MEMORY SHARING FOR BUFFERED MACRO-PIPELINED DATA PLANE PROCESSING IN MULTICORE EMBEDDED SYSTEMS," filed Mar. 11, 2013, issued U.S. Pat. No. 9,229,847, issued Jan. 5, 2016, which claims priority of U.S. Provisional Patent Application Ser. No. 61/625,754, filed Apr. 18, 2012, the subject matter of which is hereby incorporated by reference in its entirety.

FIELD

The present application provides memory management to improve the performance of memory-constrained multicore processing systems and, in particular, memory management for embedded systems that perform buffered macro-pipelined data plane processing.

BACKGROUND

Continued advances in semiconductor fabrication technologies (Moore's Law) and the engineering of systems on a chip (SoC) have resulted in the widespread development of multicore processor chips which are attractive in the theoretical performance/power metric and reduced system cost. The number of processor cores on the chip range from 2 to greater than 100 depending on the intended application, the size chip, the size of the individual cores and the amount of on-chip memory and integrated devices. The processor cores may be identical (homogeneous multicore) or different (heterogeneous multicore) and they may perform specialized data processing (data plane processing) or perform general purpose processing (control plane processing). Of particular interest here are multicore chips for embedded systems that establish periodic data flows for macro-pipelined data plane processing. Such data flow may be relatively static and may be between data plane processing nodes on either specialized signal processing cores or general purpose cores. The same chip typically also has more dynamic control plane processing that is performed on one or more general purpose cores.

In practice, a general problem with multicore processing chips is the difficulty of getting the aggregate multicore processing performance to scale with the number of cores, i.e., getting the chip performance to double when the number of cores on the chip is doubled. Even for processing tasks that are easily performed in parallel, as the number of cores is increased the incremental performance improvement may be disappointing due to processor cores competing for access to shared resources such as memory and input/output peripheral devices. Memory management units and the related peripheral memory management units address this resource sharing problem.

The software technology of embedded hypervisor virtualization is attractive for multicore processing chips in embedded systems as it provides a versatile hardware abstraction layer that supports isolated virtual computing environments and systematic resource sharing. Embedded hypervisor software executes directly on top of the hardware and virtualizes the chip's processor cores, the system memory and the peripheral devices. Hypervisors® generally facilitate the creation of multiple isolated virtual machine (VM) environments or partitions, each of which may support: 1) an operating system (OS) executing one or multiple applications on one or more cores; or 2) applications that execute without an OS.

Hypervisors® for desktop/server applications may be based on a full or nearly-full featured operating system and may contain more than a 1000 times as much code as a hypervisor for an embedded system. Examples of the desktop/server hypervisors include: VMware®'s ESX having a 2 gigabytes code base and a full Linux® OS; VMware®'s smaller ESXi having a 150 megabyte code base, without full Linux®, Citrix Systems®' Xen; Microsoft®'s Hyper-V®; and Red Hat®'s Linux KVM. These desktop/server hypervisors are typically designed for full virtualization in which there is no modification to a guest OS.

The relatively large desktop/server hypervisors often have sophisticated, yet somewhat indirect, memory management. For example, the memory management methods of the VMware® ESX and ESXi hypervisors are described in the company publications "Hypervisor Memory Management Done Right" and "Understanding Memory Resource Management in VMware® ESX 4.1". In one method, the ESX memory management performs background searching for identical memory pages that can be transparently shared between different VM and applications software elements. In another method, the ESX memory management involves installing a driver into the guest OS that implements a memory management trick called 'ballooning'. The balloon driver lets the hypervisor find out which virtual memory pages an isolated guest OS has freed up so that the hypervisor can free up the corresponding physical memory pages. From these examples, it is clear that new direct or indirect memory management methods are of interest to virtualization software companies like VMware®.

In comparison, for (the more) memory-constrained embedded system applications, the hypervisors are typically designed to be minimal in terms of lines of code and have a small memory footprint that is only several tens to several hundred kilobytes. Examples of embedded system hypervisors include Red Bend®'s VLX, Open Kernel Lab®'s OKL4 Microvisor, and the hypervisor from the Codezero® community. These hypervisors for embedded systems are typically designed for para-virtualization in which the guest OS is modified to support OS-hypervisor application interfaces (APIs).

The relatively small hypervisors for memory-constrained embedded systems tend to have more basic memory management and may benefit the most from hardware virtualization support. Intel®, AMD®, Power Architecture® and ARM® either have introduced or are in the process of introducing hardware accelerators into the processor that trap and execute sensitive/privileged instructions that have previously been processed with hypervisor software. For example, the ARM® 2011 white paper "Virtualization is coming to a Platform near You" describes the ARM® virtualization support to be available in 2012. As discussed in the Intel® 2011 white paper, "The Benefits of Virtualization for Embedded Systems" several hypervisors that take advantage of the Intel virtualization technology (Intel VT) are currently available from Wind River®, Green Hills Software®, LynuxWorks®, Real Time Systems® and TenAsys®. For memory management, virtualization hardware support may be provided for the shadowed translation and paging tables as well as the virtual-to-intermediate physical address (VA to IPA) translation tables and IPA to physical address (IPA to PA) translation tables that are the primary elements of memory management in hypervisor virtualized systems. Additional new methods of efficiently managing memory in these memory-constrained embedded systems are desired to work alongside existing memory management elements so that the virtualized multicore processing performance may be improved.

SUMMARY

The present application provides a method for sharing memory in double-buffered macro-pipelined data plane processing multicore systems. The method is attractive for virtualized multicore processing in embedded system applications that perform significant data plane processing since the methods can take advantage of the way these systems are developed and used. In such a system the application can be implemented as a user plane run-time application that is configured in conjunction with the address translation tables of a hypervisor as described herein. Other, quite likely preferred, software mechanisms exist to implement the buffer memory sharing application including: 1) an application level library function and 2) an operating system kernel extension. Experts in the design of the software architecture for multicore embedded system applications should decide the most suitable implementation for a given system given the double buffer sharing concepts of the present application.

The basic idea is to identify data buffers in main (system RAM) memory that can be shared by time-division-multiplexing the primary managed memory units, e.g., 4 Kbyte or larger memory pages, between multiple software elements executing on different cores. The goal is to have less memory being consumed for static, specialized data plane processing so that more memory can be made available to improve the performance of the dynamic general purpose control plane processing. For example, meeting this goal would enable user applications in the Android OS of a smartphone to execute faster due to an increase in the amount of memory that is made available to the VM supporting the Android OS.

Before describing the method it is noted that there are many differences between data plane processing and control plane processing in advanced embedded systems. For the most part, data plane applications for multicore embedded systems do not require isolation between application partitions since the applications are functionally related by design. As is well known, hypervisor virtualization is still useful for systematically managing data plane processor configuration and for sharing the system/chip resources. Control plane processing, however, does benefit from the security that a hypervisor provides by isolating the VM OSs and applications. Also, data plane processing generally has a much larger data-memory-to-instruction-memory ratio than control plane processing due to the restricted and efficient nature of signal/data processing/coding algorithms when compared to the majority of applications on a general purpose OS. Furthermore, unlike control plane processing, most multicore data plane processing is relatively static. It may have different modes, for example the baseband signal processing may be for LTE or for WCDMA or for WiMax, but for a given mode it is a static set of executing applications and data flow. The control plane needs protection and flexibility, but the data plane tends to be specialized and welcomes optimization. In terms of modifying the data plane source code, certain members of an advanced embedded system development team are usually quite familiar with the source code for the data plane applications. Systematic changes to the data plane source code to incorporate a new application level library function provide one type of embodiment of the present application.

An example embodiment of the present application may provide a method that includes receiving a first buffer context switch request message from a first application operating via a processor, transmitting a first buffer context switch flag to the processor operating the application confirming the first buffer context switch request was received, receiving a second buffer context switch request from a second application with a different processing cycle operating via the processor, transmitting a second buffer context switch flag to the processor operating the second application confirming the second buffer context switch request was received, and synchronizing a shared plurality of memory units between at least two different buffers and providing the shared plurality of memory units to the first application and the second application.

Another example embodiment of the present application may provide an apparatus that includes a processor and a receiver configured to receive a first buffer context switch request message from a first application operating via the processor. The apparatus may also include a transmitter configured to transmit a first buffer context switch flag to the processor operating the application confirming the first buffer context switch request was received. The receiver is also configured to receive a second buffer context switch request from a second application with a different processing cycle operating via the processor, and the transmitter is also configured to transmit a second buffer context switch flag to the processor operating the second application confirming the second buffer context switch request was received, and the processor is further configured to synchronize a shared plurality of memory units between at least two different buffers and providing the shared plurality of memory units to the first application and the second application.

DETAILED DESCRIPTION

Figure 1:
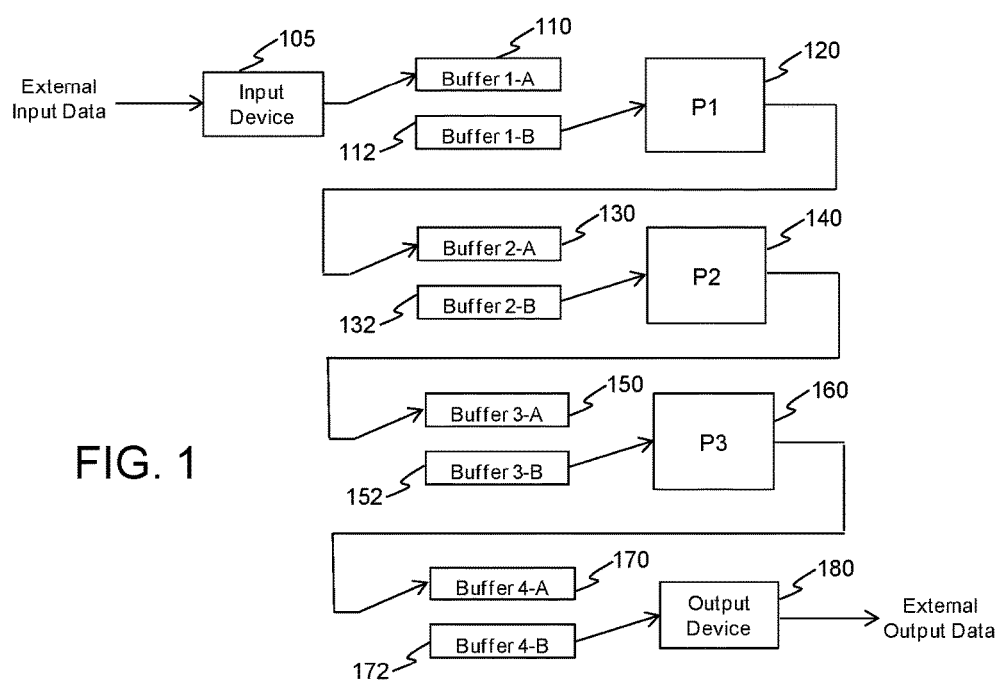
FIG. 1 is a diagram of an example data plane processing system with a double buffered data flow and a macro-pipelined processing allocation to processing cores according to an example embodiment.

FIG. 1 is a diagram of an example data plane processing system with a double buffered data flow and a macro-pipelined processing allocation to processing cores that are suitable for illustrating the present application. Examples of data plane processing applications that map well to this type of data flow and processing allocation include video data decoding/rendering and baseband signal/data processing of wireless modems. A serial sequence of processing is allocated to the different cores 140, 160, 180 so that the processing latency at each of the three cores is nearly equal. Equal latency is desired since the overall throughput performance between data input 105 and data output 180 is determined by the processing core with the largest latency. Each processing core has double shared memory buffers —110 and 112, 130 and 132, 150 and 152—for data input and output so that one buffer can be filled while the other paired buffer is being emptied.

By design, the time to empty a buffer is less than the time to fill the paired buffer and as soon as the paired buffer is filled, the filling and emptying buffer switch context, between otherwise time-adjacent data samples. Although shown as physically separate paired buffers, the buffers can be logically implemented in many ways using the same underlying basic system memory units and various address computation procedures, as is well known. This type of macro-pipelined data flow maximizes throughput for many data plane applications and considerably simplifies achieving high efficiencies since it does not involve any engineering of data and instruction thread parallelism at the kernel level.

Further throughput performance can be achieved in many applications with completely equivalent macro-parallel processing channels (not shown) each of which is identical to the one shown in FIG. 1.

Generally, increasing the size of the data buffer increases the processing that is required at each data plane core which may necessitate reallocating additional double buffered cores to the processing sequence. The best buffer size, processing allocations, and number of cores can be determined very early in the design process using high level functional simulation of the data plane processing application and using benchmark formulas for estimating the computation time of the cores, e.g., using Matlab/Simulink from The Mathworks Inc., for example. These high level functional simulations can provide timing parameters of the paired buffer filling and emptying operations that are of use in the present application.

Figure 2:
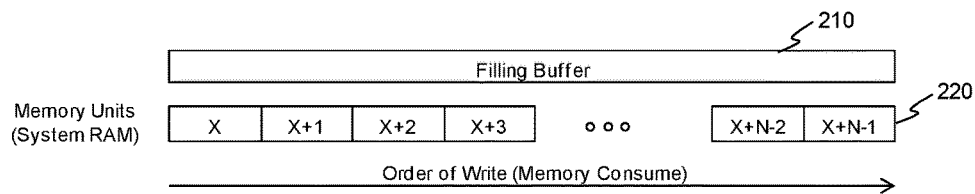
FIG. 2 is a diagram of an example double buffer pair that supports the data flow in the data plane processing system of FIG. 1 according to an example embodiment.
Figure 2:
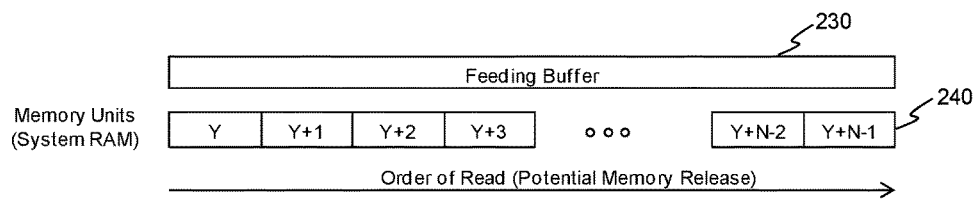

FIG. 2 is a diagram of an example double buffer pair that supports the data flow in the data plane processing system of FIG. 1 and is suitable for illustrating some primary aspects of the present application. The filling buffer 210 is filled by an upstream data source. For example, filling buffer 210 can correspond to Buffer 1-A 110 in FIG. 1, and the data source (not shown in FIG. 2) can correspond to Input Device 105. FIG. 2 indicates that the writing of the data into the filling buffer 210 consumes a sequence of memory units 220 starting with a memory unit identified by integer X and continuing to a memory unit identified by integer X+N−1 where N is the number of memory units required by each of the buffers 210 and 230 in the pair.

Continuing to refer to FIG. 2, the feeding buffer 230 is consumed by a downstream data sink. For example, feeding buffer 230 can correspond to Buffer 1-B 112 in FIG. 1 and the data sink (not shown in FIG. 2) can correspond to data plane processor core P1 120. FIG. 2 indicates that the reading of the data from the feeding buffer 230 allows a 'temporary release' of a sequence of memory units 240 starting with a memory unit identified by integer index Y and continuing to a memory unit identified by integer index Y+N−1.

The sizes of the data buffers may increase or decrease as the processing advances from input to output and are preferably relatively large, say greater than 1 Megabyte and more preferably larger still. The size of the individually managed memory units is much smaller, for example a memory page is as small as 4 Kilobytes, which results in there being hundreds of memory units per data plane processing buffer. If an individual buffer size is 1 Megabyte and the memory unit is 4 Kilobytes, the number of memory units per buffer is N=250.

At the end of a buffer filling, e.g., when the memory unit identified as X+N−1 in FIG. 2 is filled with data from the data source, the filling and feeding buffer context is switched so that buffer 230 is the filling buffer and buffer 210 becomes the feeding buffer.

In an embodiment of the present application, the memory units 220 and 240 in FIG. 2 are physical memory in the system's shared RAM memory resource. This allows that the integers X+n and Y+n, for n=0 to N−1, may identify physical memory pages that a hypervisor allocates as virtual memory to the VM partitions that it has been configured to support. A primary function of the hypervisor based memory manager is to maintain the address translation tables that relate the virtual memory addresses of the isolated VM partitions to these physical addresses. As a result, a memory manager has the opportunity to take advantage of a periodic temporary releasing of the memory units 240 or 220 that are associated with the feeding buffer 230 or 210, respectively.

Figure 3:
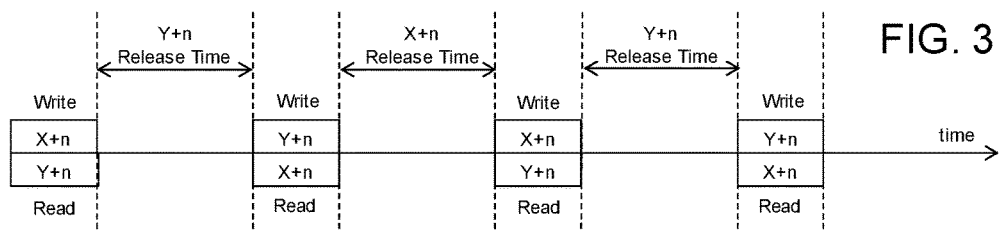
FIG. 3 is a diagram of an example timeline of reading and writing the memory units that are allocated to the buffer pair of FIG. 2 for the case of the Filling Buffer being filled at a constant rate according to an example embodiment.

FIG. 3 is a diagram of an example timeline of reading and writing the memory units that are allocated to the buffer pair of FIG. 2 for the case of the Filling Buffer being filled at a constant rate, for example from a data source such as an analog-to-digital converter (ADC) having a constant data output rate. The memory unit X+n in FIG. 3 refers to an arbitrary memory unit belonging to buffer 210 and the memory unit Y+n refers to an arbitrary memory unit belonging to buffer 230. Another assumption on the timeline example in FIG. 3 is that the rate of feeding, which involves memory reads, is equal to the rate of filing, which involves memory writes. In this simple, symmetric case, the writing or reading of memory unit X+n occurs during the same period of time that the reading or writing, respectively, of memory unit Y+n occurs.

FIG. 3 illustrates that after being read, a memory unit is potentially available for other uses for a fixed and known amount of time, as indicated by the "Y+n Release Time" and "X+n Release Time" labels on the arrows between an individual memory unit being read and written. For this symmetric case of Feeding Rate (data buffer read) equal to Filling Rate (data buffer write), $$X+n \text{ Release Time}=Y+n \text{ Release Time}=(N-1)*$$
$$\text{(Memory Unit Write Time)}.$$

The release time is equal to (N−1) times the individual Memory Unit Write Time, i.e., the time it takes for the constant rate data source to write (fill) one of the memory units.

Figure 4:
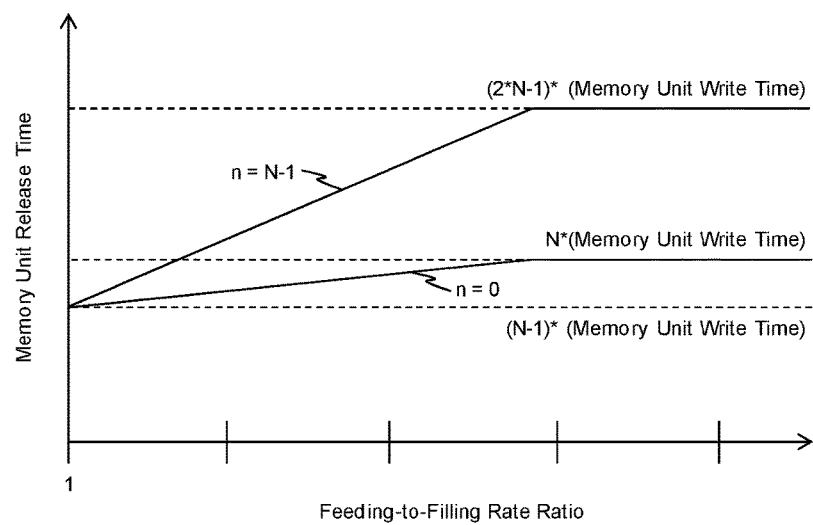
FIG. 4 illustrates how the Memory Unit Release Time becomes dependent on the position of the memory unit within the buffer for the case of a constant filling rate but a feeding rate that is faster than the filling rate according to an example embodiment.

FIG. 4 illustrates how the Memory Unit Release Time becomes dependent on the position of the memory unit within the buffer for the case of a constant filling rate but a feeding rate that is faster than the filling rate. For sufficiently large Feeding-to-Filling Rate Ratio, the $n^{th}$ memory unit in the buffer has a release time of (N+n)*(Memory Unit Write Time). However, the analysis in FIG. 4 shows that for the case of a constant filling rate, the lower memory release time of (N−1)*Memory Unit Write Time can be conservatively assumed for all memory units in paired buffers—independent of the Feeding-to-Filling Rate Ratio. This simplifies the management of released memory units in some embodiments of the present application; for example, data plane processing that is fed by a constant rate data source.

Figure 5:
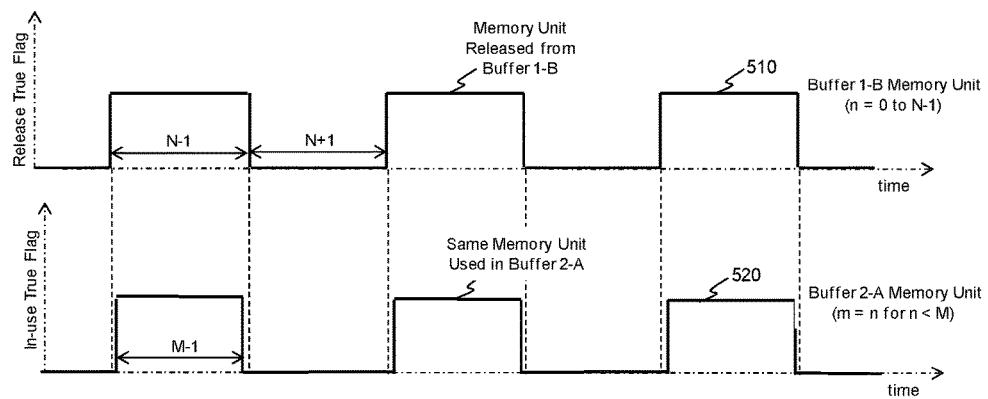
FIG. 5 illustrates how the periodic releasing of memory units from the feeding buffer of a larger buffer pair may allow the same memory units to be periodically used by a filling buffer of a smaller buffer pair of FIG. 1 according to an example embodiment.

FIG. 5 illustrates how the periodic releasing of memory units from the feeding buffer of a larger buffer pair, say Buffer 1-B of FIG. 1, may allow the same memory units to be periodically used by a filling buffer of a smaller buffer pair, say Buffer 2-A of FIG. 1. The top waveform plot 510 in FIG. 5 is a Release True Flag versus time for any $n^{th}$ memory unit of the feeding context Buffer 1-B where n=0 to N−1. The bottom waveform plot 520 is an In-use True Flag versus time for a corresponding memory unit of the filling context Buffer 2-A for example, m=n all n<M. The sharing of memory units illustrated in FIG. 5 may be accomplished with an embodiment of a suitable memory management function.

Figure 6:
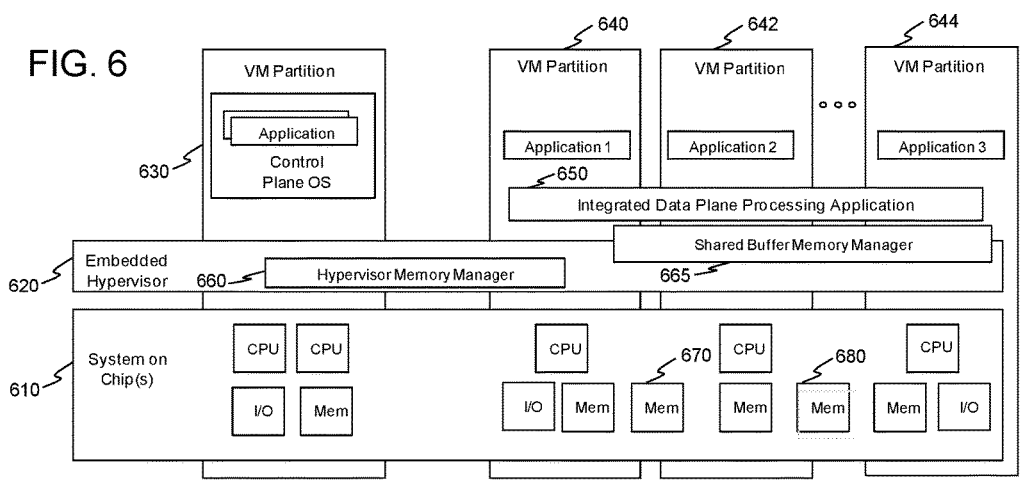
FIG. 6 is a diagram of an example multicore architecture for an embedded system according to an example embodiment.

FIG. 6 is a diagram of an example multicore architecture for an embedded system that is suitable for illustrating an embodiment of the present application. The hardware 610 is mostly on chip with input/output devices, multiple CPU cores and system RAM memory which are shown in blocks to indicate the virtual distribution of memory by the embedded hypervisor 620 to the VM partitions 630, 640, 642 and 644. In the example of FIG. 6, one VM partition 630 supports the control plane processing with multiple applications executing in a general purpose SMP OS on two cores. The other partitions 640, 642 and 644 execute on different individual cores and together support a data plane processing application 650 that consists of processing node applications, e.g., Application 1, Application 2 and Application 3, which execute in their own partitions with one core each. The hypervisor memory manager 660 maintains the virtual-to-physical address translation tables that assign and police the physical memory unit access by the partitions to the on-chip RAM system memory and the 'page fault' swapping of memory units with off-chip RAM system memory. As is well known, the hypervisor memory manager 660 may be preferably assisted by hardware in maintaining the translation and swapping tables. The new shared buffer memory manger 665 is drawn to indicate it may exist as a service in a run time environment layer.

The example multicore embedded system architecture in FIG. 6 is just one of many possible architectures that can support the addition of a memory sharing management function as an embodiment of the present application. As diagramed in FIG. 6, the memory that is shared is indicated as memory blocks 670 and 680 which are placed to suggest they each are shared between two VM partitions. The sharing of physical memory is accomplished by time-division-multiplexing the physical memory addresses between the virtual-to-physical address tables representing two or more buffer pairs. The sharing may be managed by the shared buffer memory manger 665.

Figure 7:
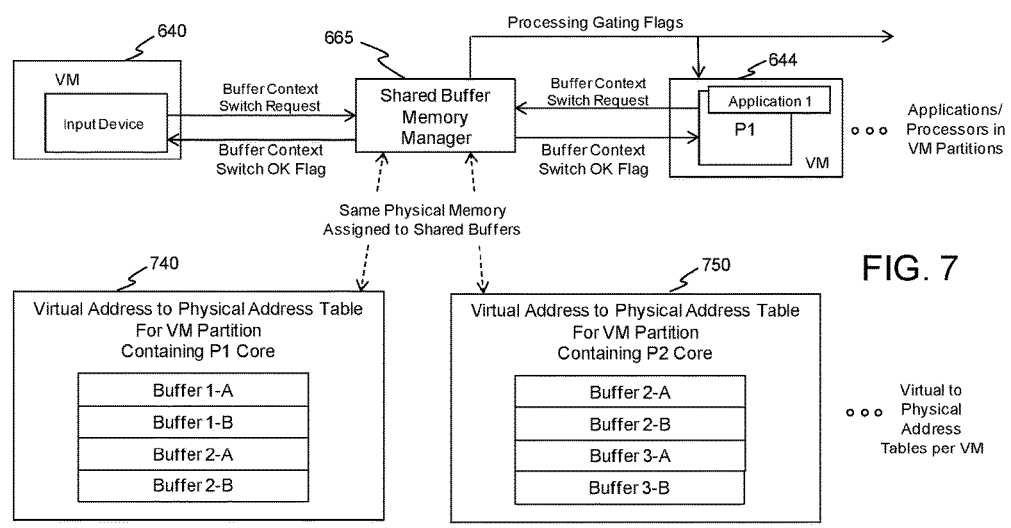
FIG. 7 illustrates the functionality of a Shared Buffer Memory Manager according to an example embodiment.

FIG. 7 illustrates the functionality of a Shared Buffer Memory Manager 665 for an example embodiment of the application. This functionality takes advantage of the virtual-to-physical address translation functions of the hypervisor memory management but does not interfere with the hypervisor management of the address translation tables. The address translation tables have been initialized so that the same physical memory is simply assigned to two buffers. These buffers share the physical memory under the management of the Shared Buffer Memory Manager 665 which has been initialized with knowledge of these sharing's and configured based on the buffer/processor associated filling/feeding timing rate parameters. In the example of FIG. 7, the Shared Buffer Memory Manager 665 receives Buffer Context Switch Requests from the processing nodes in the macro-pipelined data plane processing such as illustrated in FIG. 1. The Buffer Context Switch Request on the left-hand-side is from upstream Input Device in VM partition 640 and is for paired output buffers Buffer 1-A and Buffer 1-B to switch their feeding and filling context. The Input Device must wait until a Buffer Context Switch OK Flag is true before switching the feeding and filling context. Failure of this Buffer Context Switch OK Flag to go true in time for Input Device to keep up with the data being input to the system can be expected to result in a fatal system error condition—which with proper design should never happen. Consider the following scenario with reference to FIG. 1:

1. Feeding Buffer 1-B is read by Application 1 and the underlying physical memory units are gradually made available for use by Application 3 as Filling Buffer 2-A.
2. Filling buffer Buffer 1-A becomes full of data and Input Device sends a Buffer Context Switch Request to the Shared Buffer Memory Manager 665.

What mechanism is there to insure that the memory units associated with Feeding Buffer 2-B have been released to become available for use as the (new context) Filling Buffer 1-B? The answer is that the initialization and configuration of the Shared Buffer Memory Manager 665 uses known timing parameters of the buffers. These parameters can be determined by the high level simulations of the data plane processing which indicate the feasibility of a deterministic, periodic sharing of the underlying physical memory. The high level simulations also allow a simulation of the Shared Buffer Memory Manager 665.

Note that if the timing parameters are such that they do not allow the sharing, then obviously no sharing is performed. In this no-sharing case the address translation tables 740 and 750 may have unique physical memory assigned to each buffer.

The Shared Buffer Memory Manager 665 is only employed for memory sharing favorable cases of the buffer timing parameters. An example favorable case is when the native processing cycle time for Application 3 is faster than Application 2 is faster than Application 1 is faster than Input Device. The native processing cycle time refers here to the time it takes to completely process an input buffer to an output buffer. FIG. 7 illustrates the case where the processing of the faster downstream applications are gated by the Processing Gating Flags so that filling of a memory unit of an downstream filling buffer waits on the release of a memory unit from an upstream feeding buffer. Other configurations of native processing cycle time support the deterministic sharing of memory units between sets of double buffers of the present application.

Figure 8:
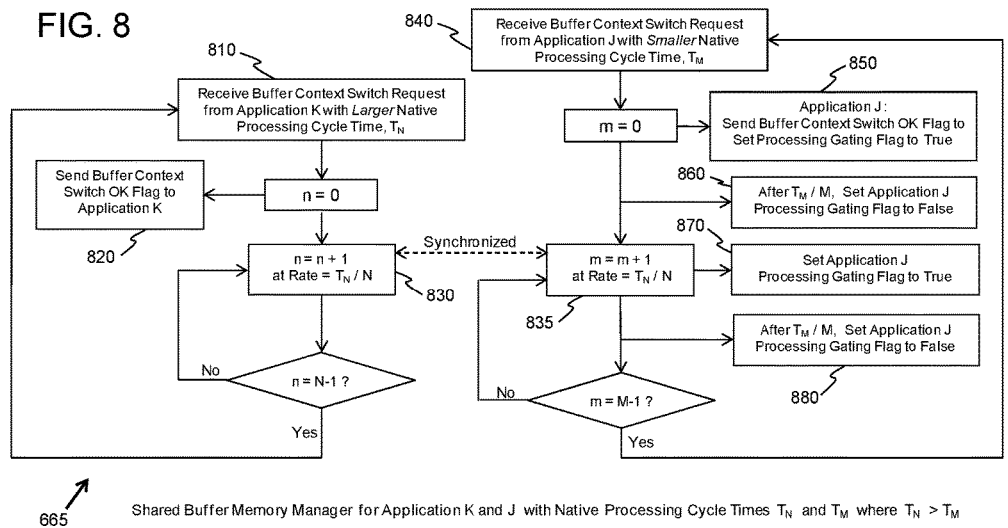
FIG. 8 illustrates a logic diagram for an example embodiment of the Shared Buffer Memory Manager according to an example embodiment.

FIG. 8 illustrates a logic diagram for an example embodiment of the Shared Buffer Memory Manager 665 of the present application. In this example the buffer memory sharing is between Application K and Application J having native processing cycle times of $T_N$ and $T_M$ seconds, respectively, where $T_N > T_M$, e.g., Application K is the slower application since it takes it longer to finish its native processing cycle. Application K and Application J also have AB buffer sizes of N and M memory units, respectively. The number of memory units which may be shared (per A or B buffer) between Application K and Application J is the smaller of N and M. When N is not equal to M, the positive difference is the number of memory units that are permanently assigned to the each AB buffer of the larger buffer pair.

Note that in this example, the physical address switching for the $n^{th} = m^{th}$ memory units is done as n sweeps from 0 to N−1 for one buffer while at the same time as m sweeps from 0 to M−1 for a shared buffer. This sweeping can be done in equal time increments and requires the Shared Buffer Memory Manager 665 to send Processing Gating Flags to the applications on the faster application/processor nodes/cores in order to synchronize the use of memory units. It is assumed in this example that the Feeding-to-Filling Rate Ratio is unity.

Referring to the example logic diagram in FIG. 8, the Buffer Context Switch Request is initially received 810 from Application K. At this time the memory unit index counter n is set to zero and a true Buffer Context Switch OK Flag is sent to Application K 820. The memory unit index counter n is incremented at a rate of once every $T_N/N$ seconds 830 since this is the rate of feeding or filling the memory units which Application K is sharing. When the memory unit index counter n reaches N−1 the control returns to module 810 in order to receive the next Buffer Context Switch Request from Application K.

Once the macro-pipelined data processing reaches the downstream Application J, a Buffer Context Switch Request is initially received 840 from Application J. At this time: 1) the memory unit index counter m is set to zero; 2) Application J is sent a true Buffer Context Switch OK Flag and a true Processing Gating Flag 850; and a counter (not shown) is started so that after $T_M/M$ seconds the Processing Gating Flag can be set to false 860. The latter results in a temporary suspension or pausing of the processing associated with Application J for buffer sharing synchronization purposes. The memory unit index counter m is incremented at a rate of once every $T_N/N$ seconds (not $T_M/M$) 835 since this is the rate of feeding or filling the memory units which the slower Application K is sharing with the faster Application J. Once memory unit index counter m is incremented, the Processing Gating Flag to Application J is again set to True 870 and after an additional $T_M/M$ seconds, i.e., the time it takes for Application J to feed or fill one memory unit, the Processing Gating Flag to Application J is again set to False 880. When the memory unit index counter m reaches M−1 the control returns to module 840 in order to receive the next Buffer Context Switch Request from Application J. In this manner, the example Shared Buffer Memory Manager 665 in FIG. 8 synchronizes the sharing of memory units between the paired AB buffers in Application J and Application K.

Various methods are known for passing messages between the processors in the VM partitions and the Shared Buffer Memory Manager 665 depending on the software design. For example, the ISA 2.06 Power Architecture provides doorbell messages and interrupts that enable software in the VM partitions to communicate with software outside of its VM without involving the hypervisor kernel. As mentioned earlier, the Shared Buffer Memory Manager 665 may be implemented as a run-time service on top of a hypervisor, or an application level library function or an operating system kernel extension.

This application provides a method for sharing memory in buffered macro-pipelined data plane processing systems. The method of adding a shared buffer memory manager is attractive for virtualized multicore processing in embedded system applications and especially those that perform significant data plane processing since the method can take advantage of the way these systems are developed and used. Data buffers in main system RAM memory can be shared by time-division-multiplexing the primary managed physical memory units between shared buffers that are accessed by software elements executing on different cores and VM partitions. The result is less memory being consumed for the relatively static and highly specialized data plane processing. This result provides the opportunity for making more memory available to the rest of the system, for example to improve the performance of the dynamic general purpose control plane processing.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Although an exemplary embodiment of the system, method, and computer readable medium of the present invention has been illustrated in the accompanied drawings and described in the foregoing detailed description, it will be understood that the application is not limited to the embodiments disclosed, but is capable of numerous rearrangements, modifications, and substitutions without departing from the spirit or scope of the invention as set forth and defined by the following claims. For example, the capabilities of the systems described throughout can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the invention, as generally described and illustrated in the figures herein, may be arranged and designed in a wide variety of different configurations. Thus, the detailed description of the embodiments is not intended to limit the scope of the invention as claimed, but is merely representative of selected embodiments of the invention.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed:

1. A method comprising:
    providing a shared plurality of memory units to a first application and a second application;
    filling the shared plurality of memory units with data from the first application;
    feeding the filled data from the shared plurality of memory units to the second application;
    receiving a first buffer context switch request message from or on behalf of the first application operating on a processor;
    processing a first buffer context switch by the processor operating the first application;
    filling the shared plurality of memory units with data from the second application;
    feeding the filled data from the shared plurality of memory units to the first application;
    receiving a second buffer context switch request message from or on behalf of the second application operating on the processor;
    processing a second buffer context switch by the processor operating the second application; and
    synchronizing said shared plurality of memory units based on the first and second buffer context switch request messages.

2. The method of claim 1, wherein the processing of the first buffer context switch and the processing of the second buffer context switch further comprise transmitting a message comprised of at least an OK message.

3. The method of claim 2, wherein the second buffer context switch request message further comprises a processing cycle time for the processing of the second buffer context switch that is smaller than the processing cycle time of the first buffer context switch.

4. The method of claim 1, wherein the first application and the second application are operating via a shared buffer memory comprising the shared plurality of memory units.

5. The method of claim 4, wherein a number of memory units of the shared buffer memory that is shared between the first application and the second application is equal to a smaller of a buffer size of the first application and the second application.

6. The method of claim 1, further comprising pausing the operation of the second application.

7. The method of claim 6, wherein the pausing the operation of the second application occurs during synchronization of the shared plurality of memory units between at least two different buffers.

8. An apparatus, comprising:
    a processor operating a first and a second application;
    a shared plurality of memory units;
    a receiver; and
    a transmitter;
    wherein the shared plurality of memory units are filled with data from the first application,
    wherein the filled data from the shared plurality of memory units is fed to the second application,
    wherein the receiver receives a first buffer context switch request message from or on behalf of the first application operating on the processor,
    wherein the transmitter transmits to the processor a first buffer context switch confirmation which confirms the first buffer context switch request message was received,
    wherein the shared plurality of memory units are filled with data from the second application,
    wherein the filled data from the shared plurality of memory units is fed to the first application, wherein the receiver further receives a second buffer context switch request message from or on behalf of the second application operating on the processor, wherein the transmitter further transmits to the processor a second buffer context switch confirmation which confirms the second buffer context switch request message was received, and wherein the processor synchronizes the shared plurality of memory units based on the first and second buffer context switch request messages.

9. The apparatus of claim 8, wherein the first buffer context switch confirmation and the second buffer context switch confirmation are comprised of at least an OK message.

10. The apparatus of claim 9, wherein the second buffer context switch request message further comprises a processing cycle time for the second buffer context switch to be processed that is smaller than the processing cycle time of the first buffer context switch.

11. The apparatus of claim 8, wherein the first application and the second application operate via a shared buffer memory comprising the shared plurality of memory units.

12. The apparatus of claim 11, wherein a number of memory units of the shared buffer memory that is shared between the first application and the second application is equal to a smaller of a buffer size of the first application and the second application.

13. The apparatus of claim 8, wherein the processor further pauses the operation of the second application.

14. The apparatus of claim 13, wherein the pause of the second application occurs while the processor synchronizes the shared plurality of memory units between at least two different buffers.

15. A non-transitory computer readable storage medium storing instructions that, when executed by a processor, cause the processor to:
provide a shared plurality of memory units to a first application and a second application;
fill the shared plurality of memory units with data from the first application;
feed the filled data from the shared plurality of memory units to the second application;
receive a first buffer context switch request message from or on behalf of the first application operating on a processor;
process a first buffer context switch by the processor operating the first application;
fill the shared plurality of memory units with data from the second application;
feed the filled data from the shared plurality of memory units to the first application;
receive a second buffer context switch request message from or on behalf of the second application operating on the processor;
process a second buffer context switch by the processor operating the second application; and
synchronize said shared plurality of memory units based on the first and second buffer context switch request messages.

16. The non-transitory computer readable storage medium of claim 15, wherein the processing of the first buffer context switch message and the processing of the second buffer context switch message further comprise at least an OK message.

17. The non-transitory computer readable storage medium of claim 16, wherein the second buffer context switch request message comprises a processing cycle time for the processing of the second buffer context switch that is smaller than the processing cycle time of the first buffer context switch.

18. The non-transitory computer readable storage medium of claim 15, wherein the first application and the second application are operating via a shared buffer memory.

19. The non-transitory computer readable storage medium of claim 18, wherein the shared buffer memory comprises the shared plurality of memory units.

20. The non-transitory computer readable storage medium of claim 18, wherein a number of the memory units shared between the first application and the second application is equal to a smaller of a buffer size of the first application and the second application.

* * * * *